United States Patent [19]
Mitsch

[11] Patent Number: 5,715,621
[45] Date of Patent: Feb. 10, 1998

[54] REGENERATIVE DESICCANT AIR DRYER

[75] Inventor: Matthew D. Mitsch, Pittsburgh, Pa.

[73] Assignee: Westinghouse Air Brake Company, Wilmerding, Pa.

[21] Appl. No.: 713,782

[22] Filed: Sep. 13, 1996

[51] Int. Cl.$^6$ .................................................. F26B 21/06
[52] U.S. Cl. ........................... 34/80; 34/82; 96/114; 96/130
[58] Field of Search ........................ 34/527, 540, 548, 34/562, 582, 79, 80, 82; 96/113, 114, 130

[56] References Cited

U.S. PATENT DOCUMENTS

| | | | |
|---|---|---|---|
| 4,197,095 | 4/1980 | White, Jr. et al. | 96/113 X |
| 4,487,617 | 12/1984 | Dienes et al. | 55/163 |
| 4,525,183 | 6/1985 | Cordes et al. | 96/113 |
| 5,209,764 | 5/1993 | Eberling | 96/114 |
| 5,335,426 | 8/1994 | Settlemeyer et al. | 34/82 X |
| 5,485,686 | 1/1996 | Sears, Jr. | 34/80 X |
| 5,522,150 | 6/1996 | Schultz | 34/80 |

Primary Examiner—John M. Sollecito
Assistant Examiner—Steve Gravini
Attorney, Agent, or Firm—James Ray & Associates

[57] ABSTRACT

A gas drying canister housing for a desiccant canister in a gas dryer system includes a main portion having an upper base and a lower portion having a lower base. A canister bore is defined between the upper and lower bases when the main and lower portions are fastened to each other. The main portion defines a supply port through which a stream of moisture-bearing gas is directed into the housing for passage through the desiccant canister during a drying mode of operation of the gas dryer system. The main portion also defines a delivery port through which a stream of dried gas is directed from the housing during the drying mode. The lower portion defines a purge port through the lower base through which a stream of remoisturized gas is expelled from the housing during a purge mode of operation of the gas dryer system. The upper base of the main portion features a sealing flange against which an outer rim portion of a top of the desiccant canister is seatable so as to make an air tight seal therebetween. The gas drying canister housing further includes a mechanism for aligning and securably retaining the desiccant canister within the housing such that when the desiccant canister is so aligned and securably retained the top of the desiccant canister aligns with and seals against the sealing flange and communication between the supply and delivery ports of the housing is possible only through the desiccant canister.

19 Claims, 3 Drawing Sheets

REGENERATIVE DESICCANT AIR DRYER

CROSS-REFERENCE TO RELATED APPLICATIONS

This application is related to copending applications Ser. Nos. 08/713,471 and 08/710,209 entitled Desiccant Canister With Positioning Bore and Molded Rubber Valve Seal For Use In Predetermined Type Valves Such As A Check Valve In A Regenerative Air Dryer, respectively, both sharing the same filing date of the present application, Sep. 13, 1996. These patent applications are assigned to the assignee of the present invention, and their teachings are incorporated into the present document by reference.

FIELD OF THE INVENTION

The present invention generally relates to a system for drying air supplied by a compressor unit for use in a pneumatic system. More particularly, the present invention relates to a regenerative air dryer system which alternately switches between removing moisture from air to be used by the pneumatic system by passing it through a first drying assembly while purging previously collected moisture from a second drying assembly and removing moisture from air to be used by the pneumatic system by passing it through the second drying assembly while purging previously collected moisture from the first drying assembly. Still more particularly, the present invention pertains to a desiccant canister assembly housing which features a mechanism for aligning and securably retaining a desiccant canister within the desiccant canister assembly housing of an air dryer system.

BACKGROUND OF THE INVENTION

It is well known that air dryer systems are designed to remove moisture vapor from a stream of compressed air into which the air dryer system is incorporated. In practice, an air dryer system employs one or more standard air drying assemblies each of which contains a moisture absorbing material to absorb the moisture from the air. In air dryer systems having one air drying assembly, the air drying assembly through its moisture absorbing material absorbs the moisture suspended in the compressed air passing through it until the compressor stops operating after a preset time. By design, this type of air dryer system then automatically flushes a quantity of the dried compressed air stored in a purge volume back through the moisture absorbing material to draw out the absorbed moisture. The stream of compressed air with the revaporized moisture it carries is then discharged to the atmosphere thereby regenerating the moisture absorbing material contained in the air drying assembly.

In air dryer systems having two air drying assemblies, the air drying system alternately cycles between removing moisture from air passing through a first drying assembly while purging from a second drying assembly moisture previously collected therein and removing moisture from air passing through the second drying assembly while purging from the first drying assembly moisture previously collected therein.

Prior to the present invention, such prior art air dryer systems generally have used the standard air drying assembly to perform the air drying function. Whether the air dryer system employs one or more standard air drying assemblies, each standard air drying assembly inserts into a housing designed to hold same. The prior art housings, however, generally retain the standard air drying assembly through a tight press fitting, or in other terms, interference fitting of the assembly within the housing. Specifically, the fit of the standard air drying assembly into its corresponding housing in the air dryer system is so tight that it typically must be hammered into the housing with a mallet or like instrument.

The standard air drying assembly and corresponding housing design thus present a number of shortcomings. First, the process of installing the standard air drying assembly into the housing is quite strenuous and takes too much time. Second, one can not be sure whether the standard air drying assembly is properly aligned within the housing so that the top of the assembly seats against and makes an air tight seal with a sealing face of the housing. Third, removal of the standard air drying assembly from the housing is often quite difficult because of its tight fit within the housing. For these reasons, a regenerative air dryer system inclusive of a novel air drying assembly housing that does not exhibit the disadvantages outlined above is described and claimed herein as follows.

The present regenerative air dryer system can be applied to a wide variety of pneumatic systems. Typical of the types of pneumatic systems to which the instant system could be applied include the pneumatic brake systems of passenger transit and freight railroad trains, subway trains and various other types of rail related transportation systems. Further examples include the pneumatic brake systems of various truck transport vehicles. Other types of pneumatic systems to which the present system could be applied may indeed be found outside the transportation field.

It should be noted that the foregoing background information is provided to assist the reader in understanding the instant invention. Accordingly, any terms of art used herein are not intended to be limited to any particular narrow interpretation unless specifically stated otherwise in this document.

SUMMARY OF THE INVENTION

In a presently preferred embodiment, the present invention provides an air drying canister housing for a desiccant canister in an air dryer system. The canister housing includes a main portion having an upper base and a lower portion having a lower base. A canister bore is defined between the upper and lower bases when the main and lower portions are fastened to each other. The main portion defines a supply port through which a stream of moisture-bearing air is directed into the housing for passage through the desiccant canister during a drying mode of operation. The main portion also defines a delivery port through which a stream of dried air is directed from the housing during the drying mode. The lower portion defines a purge port through the lower base through which a stream of remoisturized air is expelled from the housing during a purge mode of operation of the air dryer system. The upper base of the main portion features a sealing flange against which an outer rim portion of a top of the desiccant canister is seatable so as to make an air tight seal therebetween. The air drying canister housing further includes a mechanism for aligning and securably retaining the desiccant canister within the housing such that when the desiccant canister is so aligned and securably retained the top of the desiccant canister aligns with and seals against the sealing flange and communication between the supply and delivery ports of the housing is possible only through the desiccant canister.

OBJECTS OF THE INVENTION

It is, therefore, one of the primary objects of the present invention to provide a novel desiccant canister housing assembly for an air dryer system.

Another object of the present invention is to provide a novel housing assembly for a desiccant canister within an air dryer system wherein the housing assembly includes a mechanism for aligning and securably retaining the desiccant canister within the housing assembly.

Yet another object of the present invention is to provide a novel housing assembly for a desiccant canister within an air dryer system wherein the housing assembly features a threaded rod extending from a center of an upper base of the housing assembly for insertion through a positioning bore defined through a center of the desiccant canister so as to securably retain the desiccant canister about the threaded rod with a securing means so that a top of the desiccant canister aligns with and seals against a sealing flange of the housing assembly.

Still another object of the present invention is to provide a novel housing assembly for a desiccant canister within an air dryer system wherein the desiccant canister easily installs into and removes from the housing assembly as compared to prior art housing assemblies and their corresponding desiccant canisters.

A further object of the present invention is to provide a regenerative air dryer system inclusive of at least one novel housing assembly wherein a desiccant canister easily installs into and removes from the housing assembly as compared to prior art housing assemblies and their corresponding desiccant canisters.

In addition to the objects and advantages of the present invention set forth above, various other objects and advantages will become more readily apparent to persons skilled in the air dryer system art from a reading of the detailed description section of this document. Such other objects and advantages will become particularly apparent when the detailed description is considered in conjunction with the attached drawings and with the appended claims.

DETAILED DESCRIPTION OF THE INVENTION

Figure 1:
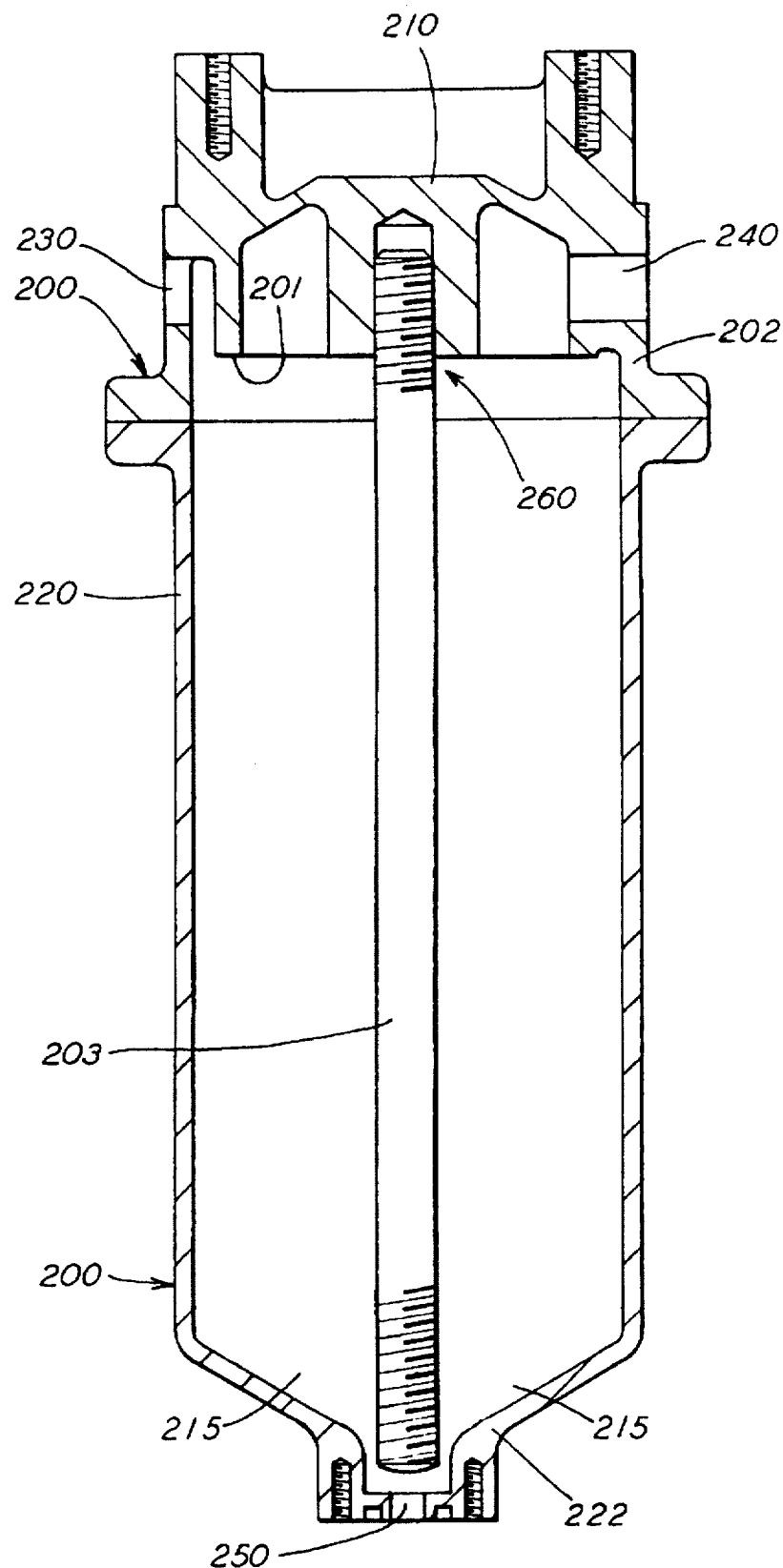
FIG. 1 is a cross-sectional view of a desiccant canister housing assembly according to the present invention.

Before describing the present invention in detail, for the sake of clarity and understanding, the reader is advised that identical components having identical functions in each of the accompanying drawings have been marked with the same reference numerals throughout each of the several Figures illustrated herein.

Figure 2:
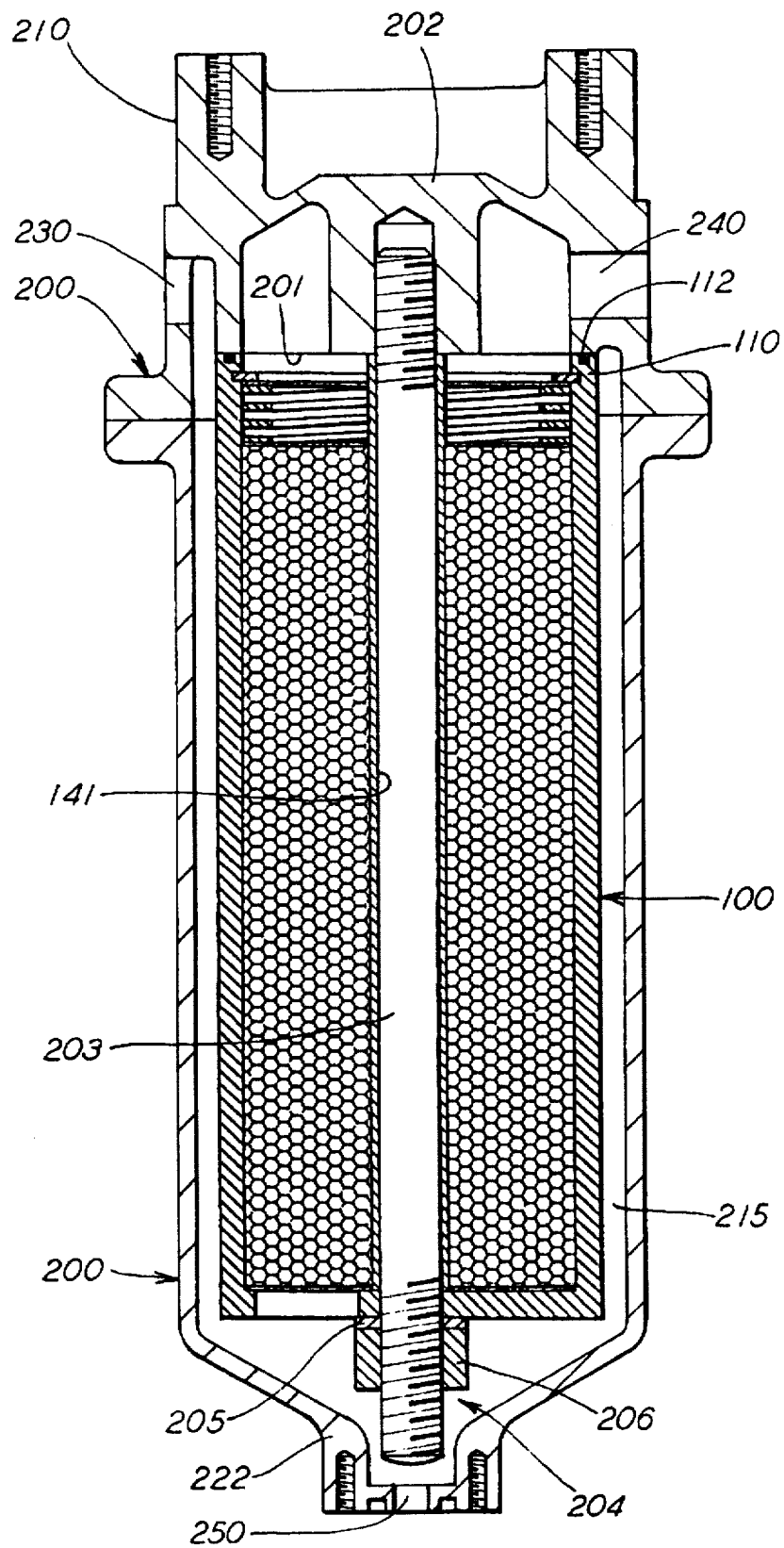
FIG. 2 is a cross-sectional view of the desiccant canister housing assembly of FIG. 1 into which a corresponding desiccant canister has been aligned and securably retained.
Figure 3:
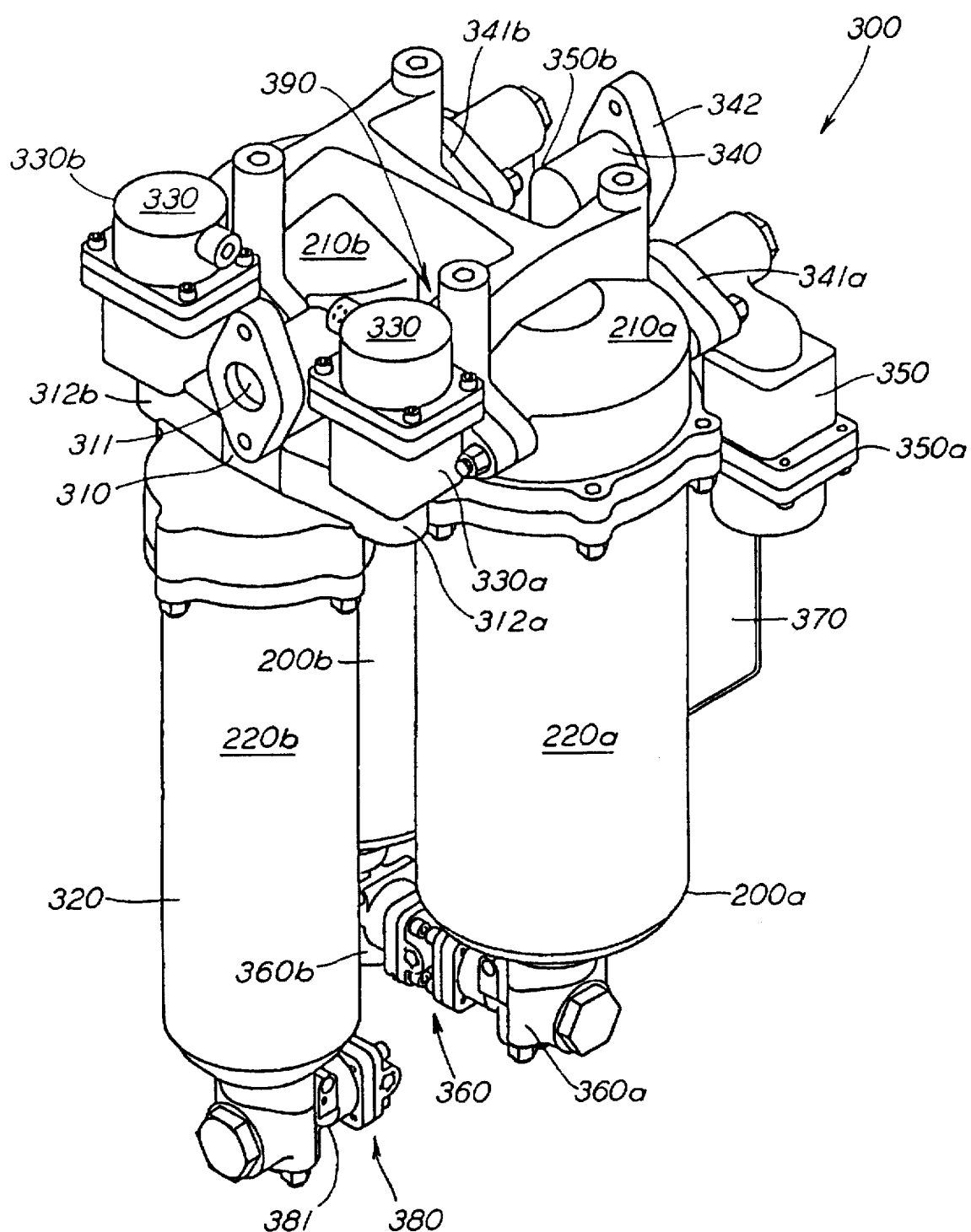
FIG. 3 is a perspective view of a regenerative air dryer system showing two desiccant canister housing assemblies of the type illustrated in FIGS. 1 and 2.

FIGS. 1 and 2 illustrate the essential details of a desiccant canister housing assembly of an air dryer system. The desiccant canister housing assembly may be used to house any one of a variety of desiccant canisters having the basic structural characteristics shown in FIG. 2. FIG. 3 shows a regenerative air dryer system that has two of the desiccant canister housing assemblies shown in FIG. 1. It is a desiccant canister having the basic structural characteristics shown in FIG. 2 that the canister housing assembly of the present invention is primarily designed to retain. One such desiccant canister is featured in one of the aforementioned documents previously incorporated herein by reference.

In a presently preferred embodiment, the desiccant canister housing assembly, generally designated 200, includes a main portion 210 and a lower portion 220. Main portion 210 has an upper base 202 and lower portion 220 has a lower base 222. A main bore extends from upper base 202 of main portion 210 and a lower bore extends from lower base 222 of lower portion 220. A canister bore 215 is defined between the upper and lower bases when main portion 210 is fastened to lower portion 220. It is within this canister bore 215 that the aforementioned desiccant canister 100 is to be housed as shown in FIG. 2.

Referring to FIGS. 1 and 2, main portion 210 defines a supply port, generally designated 230, through which a stream of moisture-bearing air is directed into housing assembly 200 for passage through the desiccant canister 100 to remove the moisture from the incoming stream of air. The moisture is absorbed by the desiccant canister housed within housing assembly 200 when housing assembly 200 is operated in a drying mode of operation by the air dryer system as is well known in the technical field pertaining to air drying. Main portion 210 also defines a delivery port, generally designated 240, through which a stream of dried air is directed from housing assembly 200 during the drying mode. Lower portion 220 defines a purge port 250 through its lower base 222 through which a stream of remoisturized gas is expelled from housing assembly 200. The moisture is expelled from housing assembly 200 when housing assembly 200 is operated in a purge mode of operation by the air dryer system as is well known in the air drying art.

Main portion 210 on its upper base 202 also features a sealing flange 201 as shown in FIGS. 1 and 2. As explained further below, sealing flange 201 is the seat which a corresponding top of the desiccant canister 100 aligns with and preferably seals against so as to make an air tight seal between the desiccant canister 100 and housing assembly 200.

The desiccant canister housing assembly 200 also includes a means, generally designated 260, for aligning and securably retaining the desiccant canister within canister bore 215. As shown in FIGS. 1 and 2, the means for aligning and securably retaining 260 includes a threaded rod 203 extending from a center of upper base 202 into lower portion 220. The threaded rod 203 is for inserting through a positioning bore defined through a center of the desiccant canister 100. The desiccant canister 100 securably retains about threaded rod 203 via a securing means 204 such as a lock washer 205 and a stop nut 206, as best shown in FIG. 2. Through securing means 204, the means for aligning and retaining 260 retains the desiccant canister 100 so that the top of the desiccant canister 100 aligns with and seals against sealing flange 201 of main portion 210.

The sealing flange 201 is preferably designed to seal against a desiccant canister that has an outer ring portion at its top. As shown in FIG. 2, the outer ring portion 110 preferably includes a groove 111 within which an o-ring 112 retains. Through o-ring 112, the outer ring portion 110 seats against and makes an air tight seal with sealing flange 201. It is through this means for aligning and securably retaining 260 that sealing flange 201 of canister housing assembly 200 aligns with and seals against the top of the desiccant canister 100. When the desiccant canister 100 and sealing flange 201 are seated against one another, communication between supply port 230 and delivery port 240 is possible only through the desiccant canister 100 as is best shown in FIG. 2.

Referring now to FIG. 4, a regenerative air dryer system, generally designated 300, includes two desiccant canister housing assemblies 200a and 200b of the type illustrated in FIGS. 1 and 2. The regenerative air dryer system 300 installs within a pneumatic system to clean and dry a stream of unpurified air received from source of pressurized air. The air dryer system 300 includes an inlet manifold 310, a coalescing filter chamber 320, a first desiccant canister housing assembly 200a, a second canister assembly housing 200b, an inlet check valve means 330, an outlet manifold 340, an outlet check valve means 350, a purge valve means 360 and controlling means 370.

The inlet manifold 310 defines a supply passage 311 for receiving the stream of unpurified air from the source of pressurized air (not shown). The inlet manifold 310 also defines first and second delivery passages, generally designated 312a and 312b, respectively. Similarly, the outlet manifold 340 defines a first supply passage and a second supply passage, generally designated 341a and 341b, respectively. Supply passage 341a connects to delivery port 240a of first housing assembly 200a as best shown in FIGS. 1 and 3. Similarly, supply passage 341b connects to delivery port 240b of second housing assembly 200b. The outlet manifold 340 also defines a delivery passage 342 through which a stream of cleaned and dried air is delivered to the pneumatic system (not shown).

The coalescing filter chamber 320 initially separates moisture and other particulates from the stream of unpurified air received from supply passage 311 of inlet manifold 310 and delivers a stream of initially filtered air to the delivery passages 312a and 312b of inlet manifold 310. The filter contained within the coalescing chamber 310 is preferably a borosilicate filter.

The inlet check valve means 330 affects flow from first 312a and second 312b delivery passages of inlet manifold 310 to first 200a and second 200b housing assemblies, respectively. The inlet check valve means 330 includes first and second normally open inlet check valves 330a and 330b. First inlet check valve 330a affects flow between first delivery passage 312a of inlet manifold 310 and supply port 230a of first housing assembly 200a as is best shown in FIGS. 1 and 3. Similarly, second inlet check valve 330b affects flow between second delivery passage 312b of inlet manifold 310 and supply port 230b of second housing assembly 200b.

The outlet check valve means 350 affects flow from first 341a and second 341b supply passages of outlet manifold 340 to delivery passage 342 of outlet manifold 340. The outlet check valve means 350 includes first and second normally open outlet check valves 350a and 350b. First outlet check valve 350a affects flow between first supply passage 341a of outlet manifold 340 and delivery passage 342 of outlet manifold 340. Similarly, second outlet check valve 350b affects flow between second supply passage 341b of outlet manifold 340 and delivery passage 342 of outlet manifold 340.

The purge valve means 360 is a device through which moisture previously collected in first 200a and second 200b housing assemblies is expelled to atmosphere. The purge valve means includes first and second normally closed purge valves 360a and 360b. First purge valve 360a connects to purge port 250a defined through the lower base of first housing assembly 200a as is best shown in FIGS. 1 and 3. Similarly, second purge valve 360b connects to purge port 250b defined through the lower base of second housing assembly 200b. The regenerative gas dryer system 300 also provides a drain valve means, generally designated 380. The drain valve means 380 includes a normally closed double seated drain valve 381 at the bottom of coalescing filter chamber 320.

The controlling means 370 generally coordinates operation of all of the valve means of the air dryer system 300 according to a preset operating cycle. During a first half of the preset cycle, the valves of the air dryer system 300 are set so that first desiccant canister housing 200a removes moisture from the stream of initially filtered air while second desiccant canister housing 200b is purged of moisture it has previously collected. Specifically, first inlet check valve 330a and first outlet check valve 350a are open and first purge valve 360a is closed while second inlet check valve 330b and second outlet check valve 350b are closed and second purge valve 360b is open. The regenerative air dryer system 300 then generally operates as follows. The stream of initially filtered air flows from coalescing chamber 320 into first 312a and second 312b delivery passages of inlet manifold 310. Because first and second inlet valves 330a and 330b are open and closed, respectively, the stream of initially filtered air flows only into first housing assembly 200a through its supply port 230a as shown in FIGS. 1 and 3. First desiccant housing 200a extracts moisture from the stream of initially filtered air. From first housing assembly 200a flows a first stream of purified air to a choke valve means, generally designated 390, located between main portions 210a and 210b. Choke valve means 390 directs the first stream of purified air in an output percentage to the pneumatic system and in a purge percentage to second housing assembly 200b. The purge percentage of the first stream of purified air flows through second housing assembly 200b thereby reabsorbing the moisture previously contained within its desiccant canister. This remoisturized air stream then flows through purge port 250b and purge valve 360b to atmosphere thereby regenerating second housing assembly 200b for a second half of the preset cycle. Meanwhile, the output percentage of the first stream of purified air flows through delivery port 240a of first housing assembly 200a into first supply port 341a of outlet manifold 340. Because first outlet check valve 350a is open, the output percentage of the first stream of purified air flows through first supply 341a and delivery 342 passages of outlet manifold 340 into the pneumatic system.

During the second half of the preset cycle, the valves of the air dryer system 300 are set so that second desiccant canister housing 200b removes moisture from the stream of initially filtered air while first desiccant canister housing 200a is purged of moisture it has previously collected. Specifically, second inlet check valve 330b and second outlet check valve 350b are open and second purge valve 360b is closed while first inlet check valve 330a and first outlet check valve 350a are closed and first purge valve 360a is open. The regenerative air dryer system 300 then generally operates as follows. The stream of initially filtered air flows from coalescing chamber 320 into first 312a and second 312b delivery passages of inlet manifold 310. Because first and second inlet valves 330a and 330b are closed and open, respectively, the stream of initially filtered air flows only into second housing assembly 200b through its supply port 230b as shown in FIGS. 1 and 3. Second desiccant housing 200b extracts moisture from the stream of initially filtered air. From second housing assembly 200b flows a second stream of purified air to choke valve means 390 located between main portions 210a and 210b. Choke valve means 390 directs the second stream of purified air in an output percentage to the pneumatic system and in a purge percentage to first housing assembly 200a. The purge percentage of the second stream of purified air flows through first housing assembly 200a thereby reabsorbing the moisture previously contained within its desiccant canister. This remoisturized air stream then flows through purge port 250a and purge valve 360a to atmosphere thereby regenerating first housing assembly 200a for the first half of the preset cycle. Meanwhile, the output percentage of the second stream of purified air flows through delivery port 240b of second housing assembly 200b into second supply port 341b of outlet manifold 340. Because second outlet check valve 350b is open, the output percentage of the second stream of purified air flows through second supply 341b and delivery 342 passages of outlet manifold 310 into the pneumatic system.

The controlling means 370 thus controls the operation of all the valve means so that the air dryer system 300 alternates between the first and second halves of the preset operating cycle. Preferably, the preset operating cycle lasts two minutes with one minute allocated for each half cycle. The controlling means 370 also controls drain valve 381 situated at the bottom of coalescing filter chamber 320 so that drain valve 381 opens briefly as the air dryer system 300 switches between the first and second halves of the preset cycle. This permits moisture previously collected in coalescing chamber 320 to be expelled to atmosphere.

The controlling means 370 includes a first actuating device, a second actuating device and an electronic controller for controlling operation of the actuating devices. The first actuating device controls operation of first inlet check valve 330a, first outlet check valve 350a, first purge valve 360a and drain valve 381. The second actuating device controls operation of second inlet check valve 330b, second outlet check valve 350b, second purge valve 360b and drain valve 381. In the presently preferred embodiment of the air dryer system, it is preferred that each of the valves be of the air piloted variety. Consequently, first actuating device is preferably a normally closed three way solenoid valve for controlling supply of pilot air to the valves under its control. Likewise, second actuating device is preferably a normally closed three way solenoid valve for controlling supply of pilot air to the valves under its control. The electronic controller includes within its electronic circuitry a timer circuit through which to control the switching between the first and second halves of the preset operating cycle.

The regenerative gas dryer system 300 further includes a pressure sensor for sensing the pressure within the air dryer system 300. When the pressure falls below a predetermined level, the controlling means 370 allows all the valves to assume their respective normally open or closed states. This will allow the maximum amount of air to pass through the air dryer system 300 thereby reducing the time required to charge the pneumatic system in which the air dryer system 300 is incorporated. Conversely, when the pressure reaches or exceeds the predetermined level, the controlling means 370 operates the air dryer system 300 according to the preset operating cycle. The controlling means 370 will generally not operate the air dryer system 300 according to the preset operating cycle unless the pressure is generally equal to or exceeds the predetermined level and the source of compressed air is loaded.

The controlling means 370 also includes a memory circuit. When the source of compressed air is loaded, the controlling means 370 receives a signal that activates the memory circuit. Through the memory circuit, equal drying and purging times can be assured for each of the first and second housing assemblies 200a and 200b. Specifically, the memory circuit remembers the point within the preset operating cycle when the source of compressed air becomes unloaded. The next time that the source becomes loaded, the signal commences and the air dryer system 300 resumes operation at the point in the preset operating cycle at which it last operated.

The controlling means 370 also includes a power shut off feature. When the supply of power to the controlling means 370 is cut off, the controlling means 370 will start at the beginning of the preset operating cycle when power is restored. This permits both the first and second desiccant canister housing assemblies 200a and 200b to perform a complete cycle upon start-up.

While the presently preferred embodiments of the canister housing assembly invention and the air dryer system incorporating same have been set forth in detail according to the Patent Act, those persons of ordinary skill in the technical art to which this invention pertains will recognize various alternative ways of practicing the invention without departing from the spirit and scope of the appended claims. Those of ordinary skill in the relevant art will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A gas drying assembly housing for a desiccant canister assembly of a gas dryer system, said gas drying assembly housing comprising:

(a) a main portion defining (i) a main bore extending from an upper base of said main portion, (ii) a supply port through which a stream of moisture-bearing gas is directed into said gas drying assembly housing for passage through said desiccant canister assembly during a drying mode of operation of said gas dryer system and (iii) a delivery port through which a stream of dried gas is directed from said gas drying assembly housing during said drying mode;

(b) a sealing flange on said upper base of said main portion against which an outer ring portion of a top of said desiccant canister assembly is seatable so as to make an air tight seal therebetween;

(c) a means for aligning and securably retaining said desiccant canister assembly within said main bore of said main portion such that when said desiccant canister assembly is so aligned and securably retained said top of said desiccant canister assembly aligns with and seals against said sealing flange of said main portion and communication between said supply and delivery ports via said housing is possible only through said desiccant canister assembly; and (d) a lower portion defining (i) a lower bore extending from a lower base of said lower portion and (ii) a purge port through said lower base through which a stream of remoisturized gas is expelled from said gas drying assembly housing during a purge mode of operation of said gas dryer system; said main portion and said lower portion are fastenable to each other so as to form said gas drying assembly housing for said desiccant canister assembly.

2. The gas drying assembly housing as recited in claim 1 wherein said means for aligning and securably retaining includes a threaded rod extending from a center of said upper base of said housing into said lower portion, said threaded rod for inserting through a positioning bore defined through a center of said desiccant canister assembly so as to retain said desiccant canister assembly about said threaded rod via a securing means so that said top of said desiccant canister assembly aligns with and seals against said sealing flange of said housing.

3. The gas drying assembly housing as recited in claim 2 wherein said securing means includes a lock washer and a stop nut threaded onto said threaded rod.

4. A gas drying canister housing in a gas dryer system for a desiccant canister assembly, said gas drying canister housing comprising:

(a) a main portion having an upper base and a lower portion having a lower base with a canister bore defined between said upper and said lower bases when said main and said lower portions are fastened to each other, said main portion defining (i) a supply port through which a stream of moisture-bearing gas is directed into said housing for passage through said desiccant canister assembly during a drying mode of operation of said gas dryer system and (ii) a delivery port through which a stream of dried gas is directed from said housing during said drying mode, said lower portion defining a purge port through said lower base through which a stream of remoisturized gas is expelled from said housing during a purge mode of operation of said gas dryer system;

(b) a sealing flange on said upper base against which an outer rim portion of a top of said desiccant canister assembly is seatable so as to make an air tight seal therebetween; and (c) a means for aligning and securably retaining said desiccant canister assembly within said housing such that when said desiccant canister assembly is so aligned and securably retained said top of said desiccant canister assembly aligns with and seals against said sealing flange of said main portion and communication between said supply and delivery ports via said housing is possible only through said desiccant canister assembly.

5. The gas drying canister housing as recited in claim 4 wherein said means for aligning and securably retaining includes a threaded rod extending from a center of said upper base of said main portion into said lower portion, said threaded rod for inserting through a positioning bore defined through a center of said desiccant canister assembly so as to retain said desiccant canister assembly about said threaded rod via a securing means so that said top of said desiccant canister assembly aligns with and seals against said sealing flange of said housing.

6. The gas drying canister housing as recited in claim 5 wherein said securing means includes a lock washer and a stop nut threaded onto said threaded rod.

7. A regenerative gas dryer system for cleaning and drying a stream of unpurified pressurized gas received from a source thereof for use by a pneumatic system, said regenerative gas dryer system comprising:

(a) an inlet manifold defining a supply passage for receiving said stream of unpurified gas from said source, a first delivery passage and a second delivery passage;

(b) a coalescing filter chamber for initially separating moisture and other particulates from said stream of unpurified gas received from said supply passage of said inlet manifold so as to deliver a stream of initially filtered gas to said delivery passages of said inlet manifold;

(c) a first desiccant canister housing having a desiccant canister therein for removing moisture remaining within said stream of initially filtered gas received from said first delivery passage of said inlet manifold so as to supply a first stream of purified gas;

(d) a second desiccant canister housing having a desiccant canister therein for removing moisture remaining within said stream of initially filtered gas received from said second delivery passage of said inlet manifold so as to supply a second stream of purified gas;

(e) an inlet check valve means for affecting flow from said first and said second delivery passages of said inlet manifold to said first and said second housings, respectively;

(f) an outlet manifold defining a first supply passage for receiving said first stream of purified gas from said first housing, a second supply passage for receiving said second stream of purified gas from said second housing and a delivery passage for delivering said first and said second streams of purified gas to said pneumatic system;

(g) an outlet check valve means for affecting flow from said first and second supply passages of said outlet manifold to said delivery passage of said outlet manifold;

(h) a purge valve means through which moisture previously collected in said first and said second housings is expelled to atmosphere; each of said housings featuring:

(i) a main portion having an upper base and a lower portion having a lower base with a canister bore defined between said bases when said portions are fastened to each other, said main portion defining (I) a supply port through which said stream of initially filtered gas from said inlet valve means is directed into said housing for passage through said desiccant canister and (II) a delivery port through which said stream of purified gas is directed from said housing;

(ii) a sealing flange on said upper base against which an outer ring portion of a top of said desiccant canister is seatable so as to make an air tight seal therebetween; and (iii) a means for aligning and securably retaining said desiccant canister within said housing such that when said desiccant canister is so aligned and securably retained said top of said desiccant canister aligns with and seals against said sealing flange of said main portion and communication between said supply and delivery ports of said housing is possible only through said desiccant canister; and (i) a controlling means for coordinating operation of all of said valve means according to a preset cycle thereby switching operation of said gas dryer system alternately between (I) a first half of said preset cycle during which moisture is extracted from said stream of initially filtered gas received from said first delivery passage of said inlet manifold that passes through said inlet check valve means into said supply port of said first housing and out said delivery port thereof from which flows said first stream of purified gas to a choke valve means that directs said first stream of purified gas in an output percentage to said pneumatic system and in a purge percentage to and through said second housing and out said purge valve means to atmosphere thereby purging said second housing of previously collected moisture and (II) a second half of said preset cycle during which moisture is extracted from said stream of initially filtered gas received from said second delivery passage of said inlet manifold that passes through said inlet check valve means into said supply port of said second housing and out said delivery port thereof from which flows said second stream of purified gas to said choke valve means that directs said second stream of purified gas in said output percentage to said pneumatic system and in said purge percentage to and through said first housing and out said purge valve means to atmosphere thereby purging said first housing of previously collected moisture.

8. The regenerative gas dryer system recited in claim 7 wherein said coalescing chamber includes a drain valve means controlled by said controlling means such that said drain valve means opens briefly as said gas dryer system switches between said first and said second halves of said preset cycle thereby permitting moisture previously collected in said coalescing chamber to be expelled to atmosphere.

9. The regenerative gas dryer system recited in claim 8 further including a pressure sensing means connected to said controlling means for sensing pressure within said gas dryer system such that when said sensed pressure falls below a predetermined level all of said valves means assume their respective normal states and when said sensed pressure reaches or exceeds said predetermined level said gas dryer system operates according to said preset cycle.

10. The gas drying canister housing as recited in claim 9 wherein said controlling means includes a memory circuit for remembering a time within said preset cycle when said source of pressurized gas becomes unloaded such that when said source again becomes loaded and said sensed pressure within said gas dryer system remains equals to or exceeds said predetermined level, said controlling means resumes operation of said gas dryer system at said time within said preset cycle.

11. The regenerative gas dryer system recited in claim 9 wherein said controlling means continues operating said gas dryer system according to said preset cycle as long as said sensed pressure within said gas dryer system equals or exceeds said predetermined level and said source of pressurized gas remains loaded.

12. The regenerative gas dryer system recited in claim 8 wherein said inlet check valve means includes:
(a) a first normally open inlet check valve affect flow between said first delivery passage of said inlet manifold and said supply port of said first desiccant canister housing; and
(b) a second normally open inlet check valve affects flow between said second delivery passage of said inlet manifold and said supply port of said second desiccant canister housing.

13. The regenerative gas dryer system recited in claim 12 wherein said outlet check valve means includes:
(a) a first normally open outlet check valve affects flow between said first supply passage of said outlet manifold and said delivery passage of said outlet manifold; and
(b) a second normally open outlet check valve affects flow between said second supply passage of said outlet manifold and said delivery passage of said outlet manifold.

14. The regenerative gas dryer system recited in claim 13 wherein said purge valve means includes:
(a) a first normally closed purge valve connected to a purge port defined by said lower base of said first desiccant canister assembly; and
(b) a second normally closed purge valve connected to a purge port defined by said lower base of said second desiccant canister assembly.

15. The regenerative gas dryer system recited in claim 14 wherein said drain valve means is a normally closed double seated drain valve.

16. The regenerative gas dryer system recited in claim 15 wherein said controlling means controls the opening and closing of said valves according to said preset cycle such that:
(a) during said first half of said preset cycle, said first inlet check valve and said first outlet check valve are open and said first purge valve is closed while said second inlet check valve and said second outlet check valve are closed and said second purge valve is open; and
(b) during said second half of said preset cycle, said second inlet check valve and said second outlet check valve are open and said second purge valve is closed while said first inlet check valve and said first outlet check valve are closed and said first purge valve is open.

17. The regenerative gas dryer system recited in claim 16 wherein said valves are air piloted valves.

18. The regenerative gas dryer system recited in claim 17 wherein said controlling means includes:
(a) a first normally closed three way solenoid valve for controlling supply of pilot air to said first inlet check valve, said first outlet check valve, said first purge valve and said drain valve;
(b) a second normally closed three way solenoid valve for controlling supply of pilot air to said second inlet check valve, said second outlet check valve, said second purge valve and said drain valve; and
(c) an electronic controller for controlling operation of said first and said second solenoid valves according to said preset cycle.

19. The regenerative gas dryer system recited in claim 7 wherein for each of said housings said means for aligning and securably retaining includes a threaded rod extending from a center of said upper base of said main portion into said lower portion, said threaded rod for inserting through a positioning bore defined through a center of said desiccant canister so as to retain said desiccant canister about said threaded rod via a securing means so that said top of said desiccant canister aligns with and seals against said sealing flange of said housing.

* * * * *

UNITED STATES PATENT AND TRADEMARK OFFICE
CERTIFICATE OF CORRECTION

PATENT NO. : 5,715,621
DATED : February 10, 1998
INVENTOR(S) : Matthew D. Mitsch It is certified that error appears in the above-identified patent and that said Letters Patent is hereby corrected as shown below:

Column 1, line 7, after "08/710,209" please insert --,--.

Signed and Sealed this

Twenty-fifth Day of April, 2000

Attest:

Q. TODD DICKINSON

*Attesting Officer*     *Director of Patents and Trademarks*